219-121

5/20/86 OR 4,590,354

United States Patent [19]

Marhic et al.

[11] Patent Number: 4,590,354

[45] Date of Patent: May 20, 1986

[54] PLASMA WELDING OR CUTTING TORCH

[75] Inventors: Gérard Marhic, Cergy; Eric Dufour, Franconville, both of France

[73] Assignee: L'Air Liquide, Societe Anonyme pour l'Etude et l'Exploitation des Procedes Georges Claude, Paris, France

[21] Appl. No.: 716,191

[22] Filed: Mar. 26, 1985

[30] Foreign Application Priority Data

Apr. 4, 1984 [FR] France ................................ 84 05286

[51] Int. Cl.[4] ................................................ B23K 9/00

[52] U.S. Cl. ....................... 219/121 PM; 219/121 PP; 219/121 PQ; 219/75

[58] Field of Search ...... 219/121 P, 121 PM, 121 PP, 219/121 PQ, 75, 121 PR, 76.16, 121 PA; 313/231.31, 231.41, 231.51

[56] References Cited

U.S. PATENT DOCUMENTS 2,858,412 10/1958 Kane et al. .

3,242,305 3/1966 Kane et al. .

4,282,418 8/1981 Wuestner ...................... 219/121 PQ 4,521,666 6/1985 Severance, Jr. et al. .... 219/121 PQ

*Primary Examiner*—M. H. Paschall

*Attorney, Agent, or Firm*—Young & Thompson

[57] ABSTRACT

The plasma torch comprises a hollow torch body whose interior is connected to a source of plasma-producing gas, a hollow electrode lodged inside this body and electrically connected to an electric supply conductor, and a nozzle provided with an orifice for the outlet of the plasma. The feature of the invention is that the torch comprises a detachable annular skirt (4) which is assembled by a screwed connection with the torch body (1) and has two axially spaced-apart seats (17*c*,18*b*) respectively for the electrode (2) and the nozzle (3), and the electrode and the nozzle are freely slidably mounted in the skirt (4) and applied against their respective seats (17*c*,18*b*) solely under the action of the pressure of the plasma-producing gas.

11 Claims, 2 Drawing Figures

PLASMA WELDING OR CUTTING TORCH

The present invention relates to a plasma welding or cutting torch.

Plasma welding or cutting torches are known which comprise, inside a torch body, an electrode coaxially mounted inside a metal nozzle for guiding a plasma-producing gas which issues through an axial orifice in alignment with said electrode.

Plasma torches of this type have the drawback of being formed by a large number of parts which results in a relatively high cost price. Further, they do not offer full guarantee as concerns safety owing to the fact that the user of the torch may accidentally touch live internal metal parts when he takes apart component parts of this torch.

An object of the present invention is to overcome these drawbacks by providing a plasma torch which is particularly simple in design, has a very small number of component parts, is cheap and very safe to use.

For this purpose, this plasma welding or cutting torch comprises a torch body whose interior is connected to a source of plasma-producing gas, a hollow electrode disposed inside said body and electrically connected to an electric supply conductor, and a plasma outlet nozzle which is in facing relation to and spaced away from the electrode and is provided with an orifice for the outlet of the plasma, said torch further comprising an annular detachable skirt secured to the torch body and having at least one seat for the nozzle which is freely slidably mounted in the skirt and is applied against its seat solely under the effect of an elastic force.

According to another feature of the invention, the detachable skirt of electrically insulating material is rigid, in the part thereof facing toward the torch body, with a first conductive sleeve screwed into a conductive element of the torch body and having on its inner surface a shoulder constituting the seat for the electrode, and it is also rigid, in the end part thereof opposed to the part facing toward the torch body, with a second metal sleeve in which the nozzle is slidably mounted and which has the seat of said nozzle, the first and second sleeves communicating with each other through an axial passage in the skirt.

The plasma torch according to the invention has the advantage of comprising only four main elements, namely the torch body, the skirt detachably mounted on the torch body, the electrode and the nozzle engaged in the skirt, the nozzle at least being freely slidable in the skirt. Consequently, it is easy to take apart and reassemble and it is of considerably reduced price. Further, the torch offers complete guarantee as concerns safety owing to the fact that, when the skirt is separated from the torch body, no live conductive part of this torch body is projecting from the body, since the conductive element of the torch body with which the first sleeve of the skirt is electrically connected is disposed in a hollow part which is of difficult access from the exterior.

An embodiment of the present invention will now be described by way of a non-limiting example with reference to the accompanying drawing in which.

Figure 2:
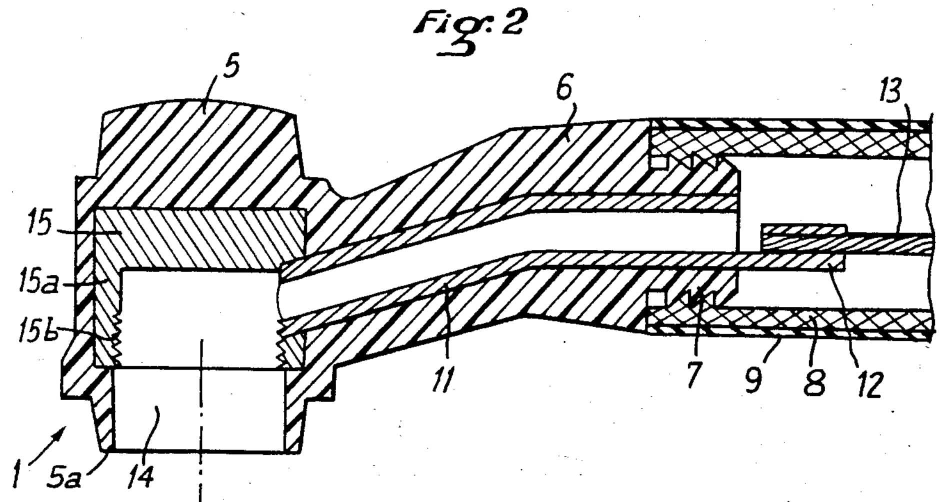
FIG. 2 is an axial sectional view of the various component elements of the torch shown separated from one another before the assembly of the torch.
Figure 2:
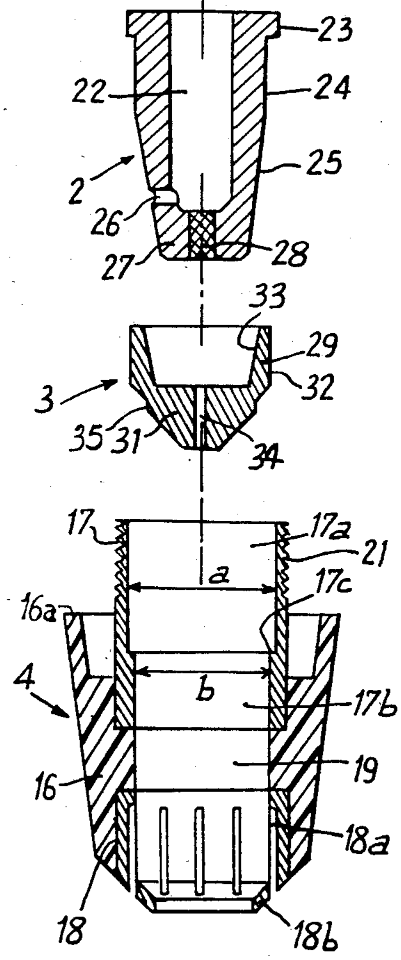

The plasma torch according to the invention mainly comprises four elements which are independent from one another and can be assembled, namely a torch body 1, an electrode 2, a nozzle 3 and a detachable skirt 4.

The torch body 1 has a central bell-shaped portion 5 and a tubular lateral extension 6 terminating in a connector 7, the central bell-shaped portion 5 and the tubular lateral extension 6 being made from an electrically insulating material. Mounted with a drive fit on the connector 7 which has outer teeth is an insulating hose or flexible pipe 8 supplying plasma-producing gas, this pipe 8 being held on the connector 7 by an outer coaxial sleeve 9. The tubular lateral extension 6 of the torch body 1 has extending therethrough a conduit in which is disposed a tube 11 composed of an electrically conductive material. This tube opens at its outer end into the insulating pipe 8 and is longitudinally extended in this region, inside the pipe 8, by a part of its periphery forming a tab 12 which is bent transversely onto itself and maintains in position the end portion of an electric supply conductor 13 located in the pipe 8.

The bell-shaped portion 5 of the torch body 1 has a central cavity 14 which is closed in its upper part and open in its lower part. Lodged in this cavity 14 is a metal cap 15 having a cylindrical lateral wall **15*a* in which is provided an opening in which is engaged the inner end of the conductive tube 11 extending through the lateral extension 6. This conductive tube 11 is advantageously secured to the metal cap 15 by welding. Further, the cylindrical lateral wall 15*a* of the metal cap 15 has a tapped hole 15*b* in its lower end part extending below the opening in which the end of the conductive tube 11 is secured. This lateral wall 15*a* provided with the tapped hole 15*b* terminates at a certain distance from the lower end 5*a* of the bell-shaped portion 5**.

The detachable skirt 4 comprises a case 16 composed of insulating material and having an annular shape, such as a downwardly tapering frustonconical shape. This case 16 has at its upper end a lateral flange **16*a* adapted to surround and cap the end 5*a* of the torch body 1. The case 16 is moulded onto two metal sleeves, namely an electrode-carrying sleeve 17 and a nozzle-carrying lower sleeve 18. The case 16 defines, between the two sleeves 17 and 18, a central passage 19 which puts the upper sleeve 17 in axial communication with the lower sleeve 18**.

The upper sleeve 17 has in its upper end part projecting from the case 16 a screw thread 21 adapted to be screwed into the tapped hole **15*b* of the cap 15 of the torch body 1. The sleeve 17 has a stepped inner surface defining an upper portion 17*a* of large inside diameter a and a lower portion 17*b* of smaller inside diameter b, the portions 17*a* and 17*b* being interconnected by a transverse annular shoulder 17*c* adapted to form a seat for the electrode 2**, as will be clear hereinafter.

Although in the preferred embodiment of the invention just described the detachable skirt 4 is secured to the torch body 1 by screwing, it will be understood that any other securing means may also be employed for this purpose.

The lower sleeve 18 defines, in the inner surface of its lateral wall, a number of longitudinal grooves **18*a* which extend downwardly and terminate in orifices provided in an annular front side 18*b* formed by an inner flange constituting the lower end of the sleeve 18. This annular front side 18*b* preferably has a downwardly tapering frustoconical shape so as to form a seat for the nozzle 3**, as will be clear hereinafter.

The metal electrode 2 has a U-shaped axial section. It has an upwardly open blind axial bore 22 communicating with the interior of the torch body 1. On the outside, the electrode 2 comprises in the downward direction an annular outwardly projecting flange 23, then a cylindrical bearing portion 24 whose outside diameter is equal to the inside diameter b of the lower portion **17*b* of the sleeve 17, then a downwardly convergent frustoconical lower portion 25. This lower portion 25 is provided with at least one tangential opening 26 at the level of the bottom of the bore 22 for the outlet of the plasma-producing gas. In the central part of the lower front relatively thick wall 27 of the electrode 2 there is axially disposed an insert 28**, for example composed of zirconium, which facilitates the striking of the arc.

In a modification, the electrode 2 could be screwed into the upper sleeve 17 of the skirt 4.

The last component element of the plasma torch according to the invention, namely the nozzle 3, includes in its upper part a skirt 29 which extends upwardly and is connected to a frustoconical lower relatively thick part 31 which is downwardly convergent.

The skirt 19 is defined by an outer cylindrical lateral surface 32 whose diameter is equal to the inside diameter of the sleeve 18, and by a frustoconical inner lateral surface 33 which has substantially the same conicity as the lower frustoconical part 25 of the electrode 2.

The frustoconical lower part 31 of the nozzle 3 is provided with a throughway axial passage 34. Further, this frustoconical lower part 31 has, in the vicinity of its upper large base, an annular step 35 of cylindrical shape having a diameter equal to or slightly less than the diameter of the opening defined by the frustoconical front wall **18*b* of the sleeve 18**.

Figure 1:
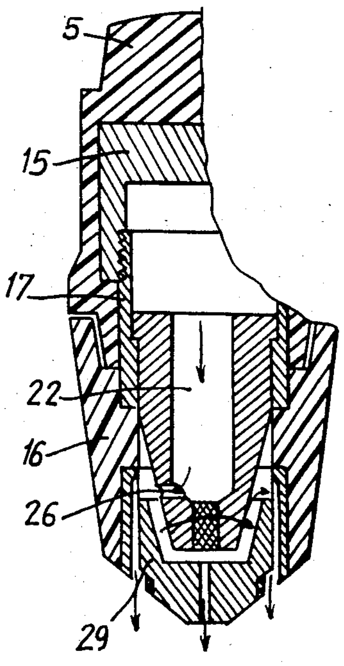
FIG. 1 is an axial sectional view of a plasma torch according to the invention.

When the plasma torch is assembled as shown in FIG. 1, the upper sleeve 17 of the detachable skirt 4 is screwed by its screw thread 21 into the tapped hole **15*b* of the cap 15 of the torch body 1, the electrode 2 is disposed in the upper sleeve 17 and bears, by its upper flange 23, against the inner shoulder 17*c*, constituting an electrode seat, of the sleeve 17, and the nozzle 3 is engaged in the lower sleeve 18 in which it is maintained in bearing relation to the frustoconical front wall 18*b* of this sleeve constituting the seat of this nozzle. The two seats 17*c* and 18*b* are axially spaced apart such distance that, in operation, the nozzle 3 is maintained at a distance from the electrode 2 while being freely slidable in the lower sleeve 18 so as to be capable of coming into contact with the electrode 2 and causing the striking of an arc between the electrode 2 and the nozzle 3. The plasma-producing gas which is supplied to the insulating pipe 8 enters the interior of the torch and flows through the tube 11 extending through the lateral extension 6 of the torch body 1, and then enters the interior of the cap 15 and then flows longitudinally downwardly in the bore 22 of the electrode 2 and issues tangentially from the bore through the opening or openings 26 and enters the space defined between the lower frustoconical part 25 of the electrode 2 and the nozzle 3. Thereafter, the gas is divided into two streams, namely a stream having a relatively low rate of flow, representing 10 to 20% of the supply rate of flow, which flows downwardly inside the nozzle 3 and issues from the latter axially through the passage 34 so as to form the plasma, and another stream corresponding to the excess gas (80 to 90% of the supply flow), this excess gas stream flowing longitudinally in the various internal grooves 18*a* of the sleeve 18** and issuing from the torch in the form of a plurality of jets surrounding the central jet forming the plasma. The flow of the plasma-producing gas is indicated by the arrows in the drawing.

The opening 26 which is provided tangentially in the electrode 2 calibrates the gas flow and produces a vortex in the space between the electrode 2 and the nozzle 3.

The electric supply current for the electrode 2 is supplied to the latter owing to the electric connection between the upper conductive sleeve 17 and the metal cap 15 to which the tube 11 is welded or soldered.

In operation, when gas under pressure is supplied to the torch according to the invention, the electrode 2 and the nozzle 3 are urged against their respective seats **17*c* and 18*b*** solely under the effect of the pressure of the gas. However, springs could also be used for this purpose.

The plasma torch according to the invention offers great safety owing to the fact that, when the detachable skirt 4 is removed by unscrewing the screw-threaded sleeve 17, the electrode 2 is automatically disconnected from the source of electric current and, moreover, no metal element extends out of the body of the torch 1, the conductive cap 15 being embedded inside this body. In this way there is avoided any risk of the user of the torch accidentally touching a live metal part.

What is claimed is:

1. A plasma-welding or cutting torch comprising:

(a) a torch body formed from insulating material and comprising a supply conductor extending through said body, said supply conductor comprising supply means for a plasma gas, said body further comprising a metal part for establishing electrical connection with said supply conductor;

(b) an annular skirt having a central annular casing of insulating material, first and second annular metal sleeves housed within said central annular casing of insulating material, and disposed in spaced axial relation thereto, said first metal sleeve being connectable to said hollow torch body; a nozzle designed to be inserted in said first metal sleeve and to abut against a front axial seat formed from said second metal sleeve; an axial electrode designed to be inserted into said first metal sleeve and to abut against a rear annular seat formed from said first metal sleeve; said annular skirt, first and second metal sleeves, axial electrode, and nozzle forming an assembly so designed that said nozzle is freely slidable within said assembly, being delimited at one extreme by said second metal casing and at the other extreme by said axial electrode, said first metal sleeve comprising connecting means for connecting said assembly to said torch body and establishing electrical connection between said supply conductor, said metal part of said body, said first metal casing, and said electrode, whereby the freely-slidable nozzle is capable of coming into contact with the front extremity of said electrode in position on its seat, said nozzle being submitted at least during welding or cutting operation to an elastic force for applying the nozzle against its seat.

2. A torch according to claim 1, wherein said supply conductor is a tube of electrically conducted material electrically in contact with said metal part, said tube forming said plasma gas supply means.

3. A torch according to claim 1, wherein said electrode is freely slidable along a cylindrical portion of said first metal sleeve.

4. A torch according to claim 1, wherein said metal part is a metal cap having screw means on which is threaded a terminal part of said first metal sleeve.

5. A plasma welding or cutting torch comprising a hollow torch body having an interior for connection to a source of plasma-producing gas, said torch body comprising a bell-shaped portion, a tubular extension portion terminating in a connector composed of an electrically insulating material, a flexible and electrically insulating pipe for supplying plasma-producing gas fitted to the connector, an electric supply conductor disposed within the pipe, the tubular extension portion defining a conduit, a tube composed of an electrically conductive material extending through the conduit and opening into the flexible pipe and connected, in the region of the pipe, to the end of the electric supply conductor, the bell-shaped portion of the torch body having a central cavity which is closed in an upper part and open in a lower part thereof; a hollow electrode; means for electrically connecting the electrode to the supply conductor comprising an electrically conductive element mounted within said interior of the torch body, said means for connecting the electrode to the supply conductor further comprising a metal cap disposed in the cavity and having a cylindrical lateral wall in which lateral wall is provided an opening, an inner end portion of the conductive tube being fixed in said opening of the cap and the cylindrical lateral wall of the cap having a lower end portion which extends below said opening in the cap and terminates at a distance from a lower end of the bell-shaped portion, said lower end portion of the cap defining a tapped hole; a nozzle disposed in facing and spaced relation to the electrode and provided with a passage for the outlet of the plasma; an annular skirt unit detachably connected to the torch body and defining at least one seat for the nozzle, which nozzle is mounted in the skirt unit to be freely axially slidable against and away from said seat, said skirt unit further comprising a case which is composed of an electrically insulating material and has a first end portion adjacent to the torch body and a second portion remote from the torch body, a first electrically conductive sleeve screw threadedly engaged in the conductive element, rigid with said first end portion of the case and defining an inner surface having a shoulder constituting said seat for the electrode, and a second lower metal sleeve which is rigid with said second end portion of the case and in which the nozzle is slidably mounted, said second sleeve defining said seat for the nozzle, the case defining an axial passage putting the first and second sleeves into communication with each other; and means for producing an elastic force for applying the nozzle against said seat.

6. A torch according to claim 5, wherein the first sleeve has an upper end portion projecting from the case and defining a screw thread adapted to be screwed into the tapped hole of the cap, the inner surface of the first sleeve includes an upper part having a large inside diameter and a lower part having a smaller inside diameter, the upper part and the lower part of the first sleeve defining therebetween said shoulder constituting said seat for the electrode.

7. A torch according to claim 5, wherein the second sleeve has a lateral cylindrical wall and an inner flange terminating a bottom end of the second sleeve and defining an annular front wall of the second sleeve, the lateral cylindrical wall of the second sleeve defines an inner surface and longitudinal downwardly extending grooves in the inner surface which terminate in orifices provided in the inner flange of the second sleeve.

8. A torch according to claim 7, wherein said annular front wall has a downwardly convergent frustoconical shape and defines said seat for the nozzle.

9. A torch according to claim 5, wherein the electrode has a U-shaped axial section and defines a blind axial bore having an open end adjacent to the interior of the torch body and a closed end opposed to the open end thereof, the electrode further comprises on the outside of the electrode, in the following order in the downward direction, an annular outwardly projecting flange, a cylindrical bearing portion having an outside diameter equal to an inside diameter of a lower part of the upper sleeve, a downwardly convergent frustoconical lower portion which is provided, substantially at the level of the closed end of the bore, with at least one tangential opening communicating with said bore of the electrode for the outlet of the plasma-producing gas, and there is axially disposed in a central part of a lower front end portion of the electrode an insert for facilitating the striking of the arc.

10. A torch according to claim 9, wherein said insert is composed of zirconium.

11. A torch according to claim 5, wherein the second lower sleeve has a lower inner flange defining a lower axial circular opening and a downwardly convergent frustoconical lower end front wall of the second sleeve, the nozzle comprises an upwardly extending upper skirt portion and a relatively thick downwardly convergent frustoconical lower end portion, the skirt portion is defined by an outer cylindrical lateral surface having a diameter equal to an inside diameter of the lower sleeve, and defined by a downwardly convergent frustoconical inner lateral surface, a frustoconical lower end portion of the electrode has substantially the same conicity as said frustoconical inner lateral surface of the skirt portion of the nozzle, the frustoconical end portion of the nozzle is provided with a throughway axial passage and has, in the vicinity of the upper end thereof, an annular step having a cylindrical shape and a diameter at the most equal to the inside diameter of said lower axial opening in the second sleeve.

* * * * *